Aug. 19, 1952 M. KATCHER 2,607,615
SHAFT SEAL AND PRESSURE PLATE THEREFOR
Filed March 20, 1948
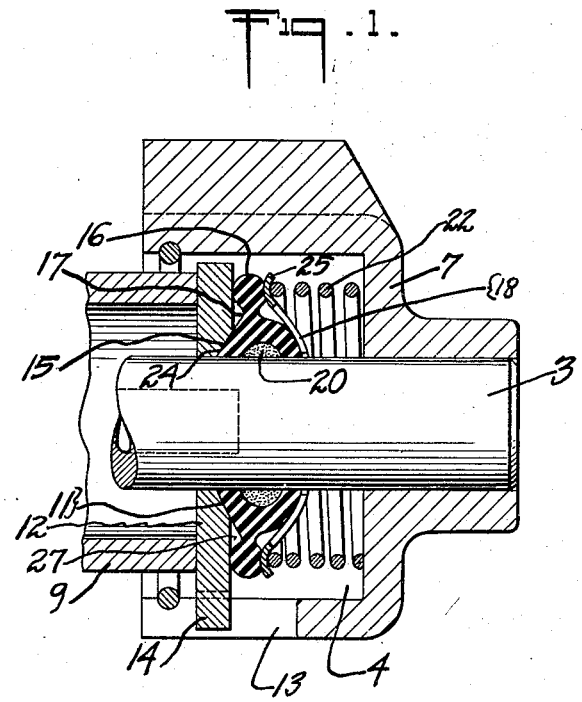
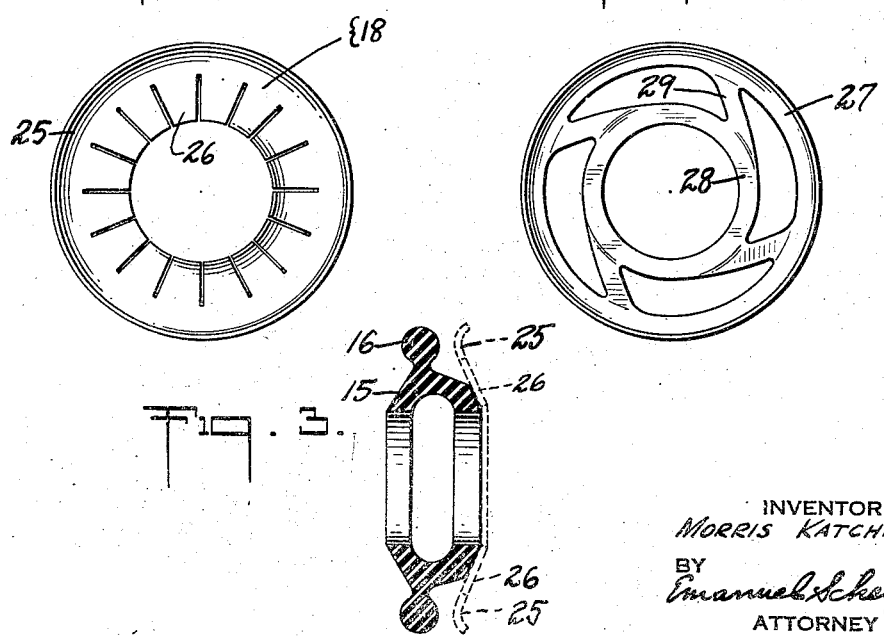
INVENTOR
MORRIS KATCHER.
BY
Emanuel Scheyer
ATTORNEY Patented Aug. 19, 1952

2,607,615

UNITED STATES PATENT OFFICE 2,607,615

SHAFT SEAL AND PRESSURE PLATE THEREFOR

Morris Katcher, New York, N. Y.

Application March 20, 1948, Serial No. 16,103

3 Claims. (Cl. 286—11.15)

This invention relates to means for holding a flexible and somewhat resilient sealing ring of rubber or the like, which ring is mounted on a shaft, in contact with the shaft and the face of a bearing in which the shaft is mounted. Such a sealing ring is used in the water pump of an internal combustion engine. The sealing ring as applied to a rotary drive shaft is adapted to eliminate or minimize leakage from the fluid chamber of the pump to the bearing of the shaft.

One type of ring or gasket of rubber or the like for use in connection with the present invention forms the subject of my Patent No. 2,288,164, June 30, 1942. This ring is caused to bind on the shaft yet has a portion extending directly radially out from it which can be freely moved axially into sealing relation with a sealing washer, pressing the latter against the bearing or its mounting. As applied to a water pump, the binding of the rubber gasket on the shaft will not interfere with the pushing of the sealing washer against the end of the bearing or its mounting, the latter usually being the hub of the pump housing.

In the construction of the aforementioned patent, difficulty has been had in the assembling of the two completely separate annular pressure plates and their individual springs used to press them against the rubber ring.

In my Patent No. 2,430,426, November 4, 1947, this difficulty was overcome by joining the annular plates with a flexible web, but two springs are required or a spring, while made in one, actually having two spring parts acting substantially independently of each other to press against the plates. The web joining the plates is so flexible that each plate acts independently of the other in pressing against the rubber ring.

In accordance with the present invention, the pressure plate consists, in one form, of an outer rim and a flexible and resilient web extending radially inward, which web bears against the radially inner portion or hub of the rubber ring when the rim is pressed against the radially outer portion of the rubber ring by a spring. With the new construction only a single spring is required, instead of the double spring of the above noted prior patents.

In another form of the present invention, the pressure plate consists of an outer rim, and a web formed of an inner ring joined to the outer rim by a flexible resilient part which may be spoked.

Both forms of the present invention differ from the construction of my Patent No. 2,430,426 in that the web, besides being flexible, has considerable resilience or elastic resistance to bending or flexing. This enables a single spring pushing against its rim, to cause the pressure plate to press against the radially inward or hub portion of the rubber ring.

Other objects and advantages will become apparent upon further study of the description and drawing, in which:

Fig. 1 is a central longitudinal section through the seal and the impeller of an automatic water pump, a fragment only of the shaft and of the journal or hub of the pump housing being shown, the shaft bearing being omitted from the housing. It is shown in my aforementioned patent.

Fig. 2 is a plan of one form of the sheet metal disk or pressure plate shown by itself.

Fig. 3 is a section through the rubber sealing ring and disk or pressure plate shown by themselves, the plate being shown dotted and in unbent condition, and Fig. 4 is a plan of a modified form of the sheet metal disk or pressure plate.

Shaft 3, which is mounted and driven as shown in Fig. 1 of my aforementioned patent, has the impeller 7 of the water pump fixed to it. A ring 11 of rubber or the like is mounted on shaft 3. Between ring 11 and the inner or forward end of hub 9 of the water pump housing, a washer 12 is slidably mounted on the shaft. It is desired to prevent the water surrounding impeller 7, which includes water in the space 4, from escaping past washer 12 into the interior of hub 9 where is located (not shown) the bearing for shaft 3.

Washer 12 is splined to impeller 7, one or more slots, as at 13, being provided in the impeller for receiving corresponding tongues of the washer as at 14. Washer 12 is of carbon, or of a phenol condensation product or of other materials which are well known to the art for washers used as in the present instance.

Ring 11 is substantially T-shaped in cross section. The main portion or head 15 of ring 11 is U-shaped in cross section with the legs of the U extending radially inward. Portion 15 extends in a general axial direction. Extending radially directly outward from main or head portion 15 is a flange or stem which in cross section has a bulb-like outer portion 16 connected by a necked-down portion 17 to the main portion 15. Ring 11 has a snug fit on shaft 3 but without binding thereon. A pressure plate 18, Figs. 1 and 2, is used to press against ring 11 for maintaining the latter in sealing relation with washer 12 and shaft 3 and in turn for maintaining washer 12 in sealing relation with the inner end of hub 9.

In one form, Figs. 1, 2 and 3, the pressure plate consists of an outer rim 25, with its forward face concaved, that is its face away from washer 12. Extending radially inward from rim 25 and to a certain extent axially forward, is a slit web 26. The slitting of web 26 gives rise to a plurality of resilient spokes extending radially inward. Compressed between the forward face of rim 25 and impeller 7 is a spring 22. This forces rim 25 rearwardly against bulb portion 16, forcing the latter against sealing washer 12 which in turn is pressed against the forward end of hub 9. Water is thus prevented from passing from the pump between the end of hub 9 and sealing washer 12 and between bulb portion 16 and washer 12.

As seen in Fig. 3 in dotted lines, web 26 normally extends axially forward a less distance than the axial distance between the forward edge of bulb 16 and the forward edge of head 15 of rubber ring 11. Therefore, when spring 22 forces rim 25 back against bulb 16, web 26 is bent against its resilience causing it to exert spring pressure on the forward leg of head 15. This results in forcing portion 15 downwardly against shaft 3 and forwardly against washer or sealing ring 12 for maintaining portion 15 in sealing relation with the washer and the washer in turn in sealing relation with the inner end of hub 9. It will be noted that web 26 engages the forward leg of portion 15 at an angle so as to force it in both directions to maintain a seal between both shaft 3 and sealing washer 12. However, the binding of said forward leg of portion 15 on shaft 3 interferes to a certain extent with its efficiency in bearing at its rearward end, that is adjacent washer 12, leaving the bearing at the latter location to take place largely through the yielding of the rubber of which portion 15 is formed. Sealing washer 12 is provided with a beveled recess 24 adjacent shaft 3, the rearward end or leg of portion 15 having a complementary bevel to fit therein, so that whatever axial pressure is transmitted to said rearward end will also cause a binding of said end on the shaft, in addition to a pressure seal with washer 12. Portion 15 is hollowed out or internally annularly grooved between its rear and forward ends to leave a space 20 which is filled with water grease. The pressure on shaft 3 of the legs of portion 15 together with the water grease in space 20 acts to keep water from the pump from traveling along the shaft and reaching the bearing (not shown) inside of hub 9. The water grease will tend to permit portion 15 to slip along the shaft to allow the axial pressure from web 26 to be transmitted directly to washer 12. Because of the annular groove or space 20, each part or leg of portion 15 can be wedged against the shaft to a certain extent independently of the other. Any binding on shaft 3 of portion 15 interferes with the pressure of ring 11 against sealing washer 12. As it is desired to get a tight seal between ring 11 and sealing washer 12 and between washer 12 and the forward end of hub 9, without interference from the binding noted above, the flange having bulb portion 16 and necked down portion 17 is provided, said flange bearing axially only against washer 12 as explained above for the action of rim 25. This prevents water from passing from the pump between the end of hub 9 and sealing washer 12 and between bulb portion 16 and washer 12.

Space 27 between bulb portion 16 and inner portion 15 can also be filled with water grease to assist in the sealing action between ring 11 and sealing washer 12.

In the modified form of pressure plate shown in Fig. 4, the radially inner end of the slit or spoked web 26 of pressure plate 18 is replaced with a ring plate 28. In a broad sense, plate 28 can be considered as the radially inner end of the modified web. Spokes 29, extending between radially inner ring plate 28 and radially outer ring plate 27, are flexible so that when ring plate 27 is forced against bulb 16 by spring 22, ring plate 28 will bear against the forward leg of portion 15. The flexibility of spokes 29 is increased by having them extend circumferentially as well as radially. While spokes 29 must be resilient enough to cause ring plate 28 to press rearward against portion 15 to effect the latter's sealing function, yet they must be flexible enough or have enough give in them to allow ring plate 27, under the influence of spring 22, to press sufficiently against bulb 16 for its sealing function. The same holds true for split web 26 of pressure plate 18 having rim 25. Web 26 must be resilient enough to provide the necessary stiffness for it to press rearward against portion 15 to effect the latter's sealing function, yet it must be flexible enough to allow rim 25 to move back to press sufficiently against bulb 16 for the latter's sealing function.

The term "rubber" as used in the claims is intended to be broad enough to cover other materials of like characteristics such as synthetic rubber.

In the particular embodiments illustrated, the inner part of the web is normally set forward a substantial distance axially from the rim, that is, when the web is unsprung, its inner part is at a substantial axial distance forward of the rim. It will be readily understood that this distance may be decreased or increased depending on the flexibility and resilience of the web and the relative axial locations of the inner and outer portions of the ring.

I claim:

1. For use in a fluid seal with a rubber ring having a radially outer portion and a radially inner portion at a substantial distance radially inward and axially forward from said outer portion, said portions requiring individual pressure against them to effect the seal, a spring for furnishing said pressure, a pressure plate having a rim and a flexible resilient web, said plate being suitably formed with respect to the rubber ring that its rim is on line axially with said outer portion, and normally to have its web engage said inner portion with its rim out of contact with said outer portion, the rim when pressed by the spring being moved against its resilience axially rearward into contact with said outer portion with sealing pressure, the web being stiff enough, when the rim is so forced, to exert sealing pressure against said inner portion, the form of the plate, then relatively to the ring, being such that between the place of contact of the rim and the ring and the place of contact of the web and the ring, the plate is out of contact with the ring.

2. For use in a fluid seal with a rubber ring having a radially outer portion and a radially inner portion at a substantial distance radially inward and axially forward from said outer portion, said portions requiring individual pressure against them to effect the seal, a spring for furnishing said pressure, and a pressure plate having a rim and a flexible resilient web, the rim being on a line axially with said outer portion, and the web having its inner part on a line axially with said inner portion, the rim before being engaged by the spring being offset axially rearward from said outer portion and out of contact therewith when the inner part of the web is set against said inner portion, said rim, after being engaged by the spring and receiving pressure therefrom for effecting the seal, being moved rearward and held against said outer portion while the web presses with sealing pressure against said inner portion, the web having sufficient stiffness to produce said sealing pressure.

3. For use in a fluid seal between a shaft and its bearing housing, said seal having a sealing washer with one face adjacent the housing, a rubber ring encircling the shaft adjacent the other face of the washer, said ring having a radially inner portion and a radially outer portion at a substantial distance radially and axially from the inner portion, a spring, and a pressure plate comprising a rim and a web, the rim being axially in line with said outer portion and the web having its radially inner part axially in line with said inner portion, the spring bearing against the rim on its opposite face from the ring and forcing it into contact with the outer portion of the ring, the place of contact of the spring with the rim being in substantially axial alignment with the place of contact of the rim and said outer portion, said plate, before being acted upon by the spring, being formed relatively to the ring to have its rim out of contact with the outer portion of the ring when the inner part of the web is set against the inner portion of the ring, the web being flexible enough to permit the rim to be forced by the spring axially into contact with said outer portion with sealing pressure at the same time the inner part of the web contacts said inner portion, the web being stiff enough when the rim is so forced to exert sealing pressure itself against said inner portion.

MORRIS KATCHER.

REFERENCES CITED

The following references are of record in the file of this patent:

UNITED STATES PATENTS

| Number | Name | Date |
|---|---|---|
| 1,914,759 | Schwitzer et al. | June 20, 1933 |
| 2,225,758 | Stein | Dec. 24, 1940 |
| 2,430,426 | Katcher | Nov. 4, 1947 |